T. J. Mead.
Car Brake.
No. 25,345. Patented Sept. 6, 1859.

Witnesses;

Inventor;
Thomas J. Mead

UNITED STATES PATENT OFFICE.

THOMAS J. MEAD, OF PORT BYRON, NEW YORK.

BRAKE FOR RAILROAD-CARS.

Specification of Letters Patent No. 25,345, dated September 6, 1859.

*To all whom it may concern:*

Be it known that I, THOMAS J. MEAD, of Port Byron, in the county of Cayuga and State of New York, have invented certain new and useful Improvements in the Manner of Arranging and Applying Brakes to Railroad-Cars; and I do hereby declare the following to be a full, clear, and exact description of the same, reference being had to the accompanying drawings, making a part of this specification, in which—

Figure 1:
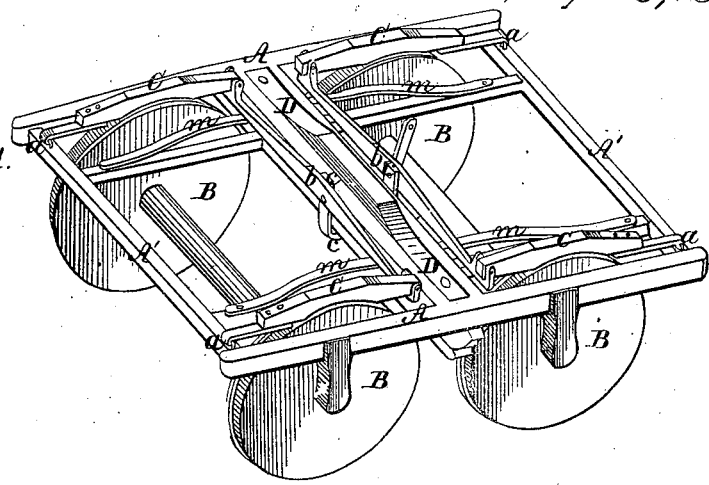
Figure 2:
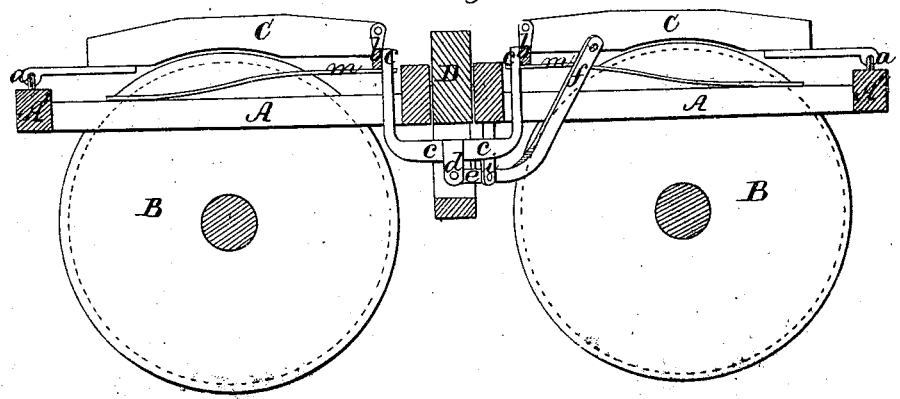

Figure 1 represents a perspective view of a truck with the brake in question applied thereto. Fig. 2 represents a vertical longitudinal section through the truck.

I am aware that brake blocks have been applied to the tops of the wheels, with a view of taking the force, when applied, through the axles in a vertical line or nearly so, to the rail, and thus present the uneven wearing upon the journals, which occurs when the force comes upon them in an oblique line.

I am also aware that, brake blocks in pairs, or sets, have also been applied to the tops of the wheels of a truck. But this system of applying brakes, though possessing many desirable advantages, among which may be mentioned those, of preserving the journals of the axles from undue strain and wearing away, and of preventing the slip of the tread of the wheels upon the rails, which when not counteracted soon wears them from their circular form, into that of a series of sides or segments, and thus renders them useless, has not, heretofore, gone into use, but on the contrary, where they have been tried they have been abandoned, and the more common vertical brake blocks substituted therefor. The difficulty in their application, did not arise from any defect in this system of brakes, but from the manner in which that system was attempted to be carried out.

Too much of the arc of the wheels was impinged upon by the brake blocks. There was no certainty that each block of the pair was, or that each pair of the brakes were, exerting their due share of pressure upon their respective wheels, because they did not all touch their wheels at the same time, nor with the same extent of impact surface, the first block, or the first pair of blocks, preventing the others from coming down fully and fairly upon their wheels.

Again, these blocks, or pairs of blocks, were attempted to be applied, by a system of compound levers, toggle-joints, chains, and other mechanical contrivances, which had so much lost motion before they transmitted their power to the brake blocks, and through them to their wheels, as to prevent the stopping of the car, or train within such reasonable time, or distance, as was desirable. Thus the failure to properly apply this kind of brake, has been the means of condemning the very best system that has been essayed, for its saving in journals, and wheels alone, is of the highest importance in the economical management of railroads.

With all the existing prejudice against this system of applying the brake-blocks to the tops of the wheels, I have devised, and have applied, a mode of operating them that is cheap, simple, and highly successful and effective, as I have proven by a series of long tried experiments.

My invention consists in the manner in which I combine the pairs of short brake blocks with a bent or U shaped piece of iron, and a single lever, so that the brakes are applied with certainty, with uniformity of pressure, quickly and efficiently, and without any danger of their becoming jammed.

To enable others skilled in the art to make and use my invention, I will proceed to describe the same with reference to the drawings.

The truck frame A, and the wheels B, may be of any of the usual well known forms and construction. To the front and rear cross pieces A′, of the truck frame, are hinged as at $a$ respectively the ends of the brake blocks $c$, which extend over their respective wheels—their opposite ends terminating near the bolster D, where the ends of the pairs of blocks are united by a bar $b$, extending across from one to the other. The brake blocks are made short, and but slightly rounded out, so as to present but little of its surface to the arc of the wheel, and that as nearly perpendicular over the journals as practical, so that the force applied shall be transmitted to the rail directly through the journals. A bent or U shaped piece of iron $c$ that passes down underneath the bolster D, has its ends connected respectively to the two cross bars $b$, so as to unite them firmly together. On the underside of the bent piece $c$ there is a lug or short arm $d$, to which the short arm $e$, of a bent lever $f$, that has its fulcra at $i$, is pivoted, the fulcra or support *i* for said lever *f* being secured to the bolster D. The power of the lever *f* is thus directly applied to the brake blocks, by any of the usual means of applying brakes to car wheels, without any lost motion.

*m*, *m*, are springs for raising, and holding up, the pairs of brake blocks when they are not in use.

The central arrangement of the bent connecting piece *c*, is such that, every brake block is brought down with certainty, and uniformity of force—no one of the series, or pairs, though they may first reach their respective wheel or wheels, preventing the others from applying their due proportion of effective force. Besides, this central connecting or transmitting point, in no wise interferes with the ordinary springs as generally applied to cars, and hence my brakes can be readily and cheaply applied to cars already constructed, there being no necessity of removing or altering its parts.

Having thus fully described my invention what I claim therein as new and desire to secure by Letters Patent is—

The combined use of the U shaped yoke, the brake bars, and the short brake blocks, for the purpose of adapting the brake to a simple lever that acts directly upon it, as herein stated.

THOMAS J. × MEAD.
his mark

Witnesses:
M. C. GRITZNER,
E. COHEN.